WAKEMAN & BUSH.
Coffee Pot.
No. 103,946.
Patented June 7, 1870.
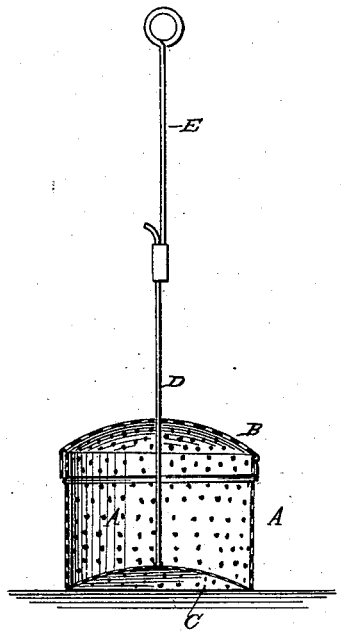

UNITED STATES PATENT OFFICE.

JOSEPH B. WAKEMAN AND ALONZO M. BUSH, OF HANCOCK, NEW YORK.

COFFEE AND TEA STEEPER.

Specification forming part of Letters Patent No. 103,946, dated June 7, 1870.

*To all whom it may concern:*

Be it known that we, JOSEPH B. WAKEMAN and ALONZO M. BUSH, of Hancock, in the county of Delaware and State of New York, have invented a new and useful Improvement in Coffee and Tea Steeper; and we do hereby declare that the following is a full, clear, and exact description thereof, which will enable others skilled in the art to make and use the same, reference being had to the accompanying drawing, forming part of this specification, in which the figure is a vertical section of our improved coffee and tea steeper.

Our invention has for its object to furnish an improved device for containing coffee or tea while being steeped, which shall be simple in construction, and more effective and satisfactory in operation than the steepers as heretofore made; and it consists of the combination of the sliding extension-handle and perforated concave bottom with the perforated body of the steeper, as hereinafter more fully described.

A represents the body of the steeper, which may be cylindrical in form, or of any other desired and convenient shape, and which is made of sheet metal, finely perforated, to prevent the escape of the fine particles or grounds of the coffee or tea, while at the same time allowing the water to pass through freely.

The upper end of the body A is provided with a cover, B, also made of finely-perforated sheet metal, and fitting closely upon the upper end of the said body A. The bottom C of the body A is also made of finely-perforated sheet metal, and is made concave upon its outer side and convex upon its inner side, as shown in the figure. The effect of this construction is to cause the water in the coffee or tea pot to boil up through the bottom of the steeper, so that all the coffee or tea in the steeper will be thoroughly acted upon and steeped.

To the center of the bottom C is securely attached the lower end of the rod D, which passes up through the cover B, and the upper end of which passes through a keeper or eye attached to the lower end of the rod E, where it is kept in place, and prevented from slipping out of said keeper or eye by having its upper end bent over, or by having a head or nut formed upon or attached to it.

The upper end of the rod E may have a ring or other handle formed upon or attached to it, for convenience in handling the steeper.

The sliding extension handle or rod D E enables the steeper to be easily and conveniently placed in and removed from the coffee or tea pot, and when placed in the coffee or tea pot the upper part, E, of the rod or handle may be pushed or slid down upon the lower part, D, so that the lid of the coffee or tea pot may be closed without interfering with the said rod or handle D E.

Having thus described our invention, we claim as new and desire to secure by Letters Patent—

The extension-rod formed in two parts, D and E, in combination with the box, consisting of the perforated body A, cover B, and concave bottom C, as shown and described.

JOSEPH B. WAKEMAN.
ALONZO M. BUSH.

Witnesses:
H. F. LEONARD,
P. AGAN.